United States Patent

[11] 3,585,603

[72] Inventors Charles W. Ross
Hatboro;
Thomas A. Green, Roslyn, both of, Pa.

[21] Appl. No. 745,217
[22] Filed July 16, 1968
[45] Patented June 15, 1971
[73] Assignee Leeds & Northrup Company
Philadelphia, Pa.

[54] COMPUTER TREND RECORDER
4 Claims, 14 Drawing Figs.

[52] U.S. Cl. .................................................. 340/172.5
[51] Int. Cl. .................................................. G06f 3/12,
G06f 15/06, G06f 15/46
[50] Field of Search ........................................... 340/172.5;
235/157, 151.12; 346/29

[56] References Cited

UNITED STATES PATENTS

| | | | |
|---|---|---|---|
| 3,254,324 | 5/1966 | Casciato et al. .............. | 340/172.5 X |
| 3,267,434 | 8/1966 | Clark et al. .................... | 340/172.5 |
| 3,275,994 | 9/1966 | Joseph.......................... | 340/172.5 |
| 3,278,926 | 10/1966 | Wiley et al.................... | 346/29 |
| 3,302,181 | 1/1967 | Lee ............................. | 340/172.5 X |
| 3,393,300 | 7/1968 | Jennings et al. .............. | 340/172.5 X |
| 3,434,113 | 3/1969 | Wiley et al.................... | 340/172.5 |
| 3,434,115 | 3/1969 | Chomicki...................... | 340/172.5 |

*Primary Examiner*—Paul J. Henon
*Assistant Examiner*—Sydney Chirlin
*Attorney*—Woodcock, Phelan and Washburn

ABSTRACT: A process control system in which a digital computer acts in conjunction with a plurality of external devices is described. Values stored in computer memory and representative of different variables of the process can each be displayed on a multipoint recorder so that an operator has access to a display of any selected variable of the process under control. The multipoint recorder produces an interrupt signal in response to the recording of each point to request the interrupt server in the computer to output the next point to be recorded. The computer also produces a plurality of timed pulse duration signals each of which may be used to control external devices, for example, control valve drive actuators. These timed pulse duration signals are produced by the computer memory and priority interrupt server acting in cooperation with an external counter to produce the signals with minimum expenditure of computer time.

PATENTED JUN 15 1971 3,585,603

COMPUTER TREND RECORDER

BACKGROUND OF THE INVENTION

In may process control systems a digital computer operates in conjunction with a plurality of external devices. One example of such a system is the Harple et al. U.S. Pat. No. 3,229,276 wherein a plurality of analog input signals are sequentially applied through a converter to a digital computer. Systems of this type have the disadvantage that the computer often must wait for the external device.

Other systems are in use in which the computer provides output signals to an external device. An example of such a system is shown in U.S. Pat. No. 3,221,309 to Benghiat.

The Benghiat patent shows a supervisory control system in which the digital computer provides outputs to an output device. The output device provides a "not busy" signal which activates an interrupt control in the computer.

In many process control systems it is desirable to record a plurality of values, from the computer, indicating the condition of the process under control. For example, in "Communication Through the Process Computer", B. D. Coffin, Instrument Society of America Preprint No. D–4–3–DAHCOD–67, there is described a process control system in which a plurality of recorders each record a different variable of the process under control. Signals from the computer indicative of these variables are outputted to a plurality of registers, one register for each variable to be recorded. Each register provides digital-to-analog conversion so that the output of each register can be recorded on an analog recorder.

This type of system requires a separate output channel from the computer and a separate register-converter for each variable to be recorded. It also requires a full recorder channel for each variable. The provision of this extensive amount of equipment is quite expensive.

SUMMARY OF THE INVENTION

This invention relates to process control systems and more particularly to a process control system including a digital computer and a plurality of external devices.

One object of the present invention is to reduce the complexity of the equipment required when a digital process control computer is operating in conjunction with a plurality of external devices.

It is another object of the present invention to provide a process control system in which the computer is never required to wait for an external device.

It is another object of the present invention to provide a process control system in which a plurality of values stored in computer memory and representative of different variables of the process can each be displayed on a recorder so that an operator has access to a display of any selected variable of the process under control.

It is another object of the present invention to provide a process control system in which timed pulse durations are provided as outputs of the computer and in which the amount and complexity of external equipment required to provide timed pulse durations is considerably reduced.

It is another object of the present invention to provide a process control system in which a plurality of time pulse durations are provided as outputs and in which the computer time required for timing these pulse durations is a minimum.

In accordance with these and other objects, the invention may be embodied in a combination comprising a stored program type process digital computer and a multipoint analog recorder multiplexed to utilize a plurality of values from said computer. The computer includes an input means for receiving a plurality of primary element input signals to be stored and processed under control of the stored program, a priority interrupt logic circuit, and a digital-to-analog converter at the output of the computer for outputting values to be utilized by the recorder. A programmed interrupt server interrupts the normal order of the program in response to the priority interrupt logic circuit to update the output value to be utilized by the recorder. The computer also includes a means for producing a reference signal in timed relation to the recording of at least one specific point, the reference signal synchronizing the output of the digital-to-analog converter with the point to be recorded. The recorded includes means for producing a priority interrupt signal for the priority interrupt logic circuit.

Further objects, features and advantages of the present invention will be more apparent from the following more detailed description.

DESCRIPTION OF PARTICULAR EMBODIMENTS

Figure 1:
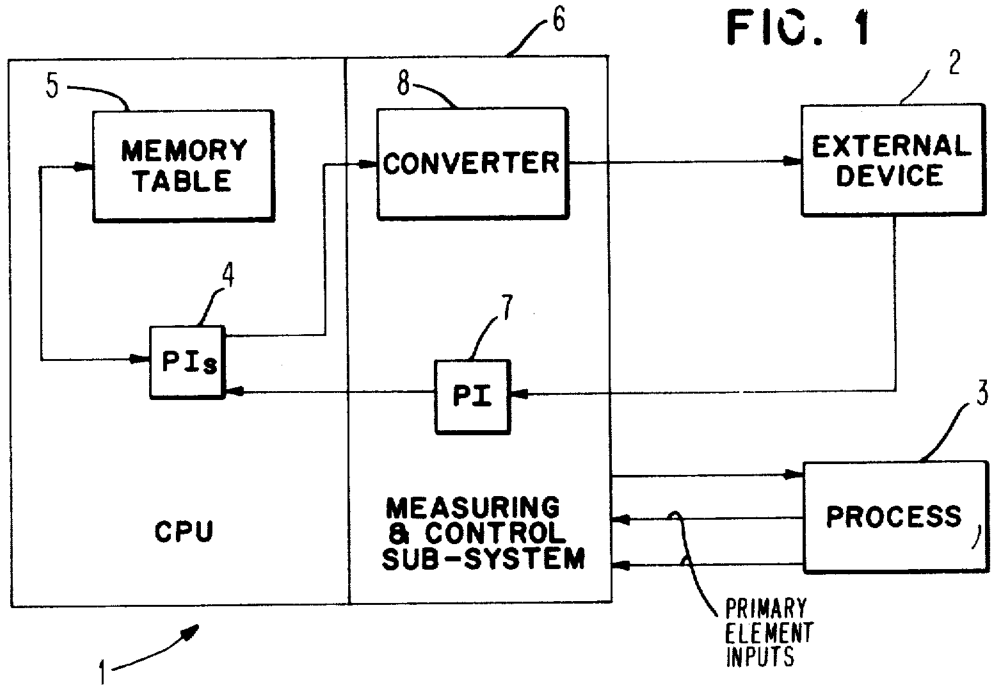
FIG. 1 is a block diagram of a process control system constructed in accordance with the invention.

Referring to FIG. 1, there is shown a process control system including a computer 1 operating in conjunction with an external device 2 or a plurality of external devices. A process 3 is controlled in this system.

The computer 1 includes a central processing unit including a priority interrupt server 4 and memory table 5. Operating with the standard digital computer is an interface or measuring and control subsystem 6. This interface subsystem is unique to process control computers. This subsystem includes priority interrupt logic circuitry 7 and a converter 8.

Figure 2:
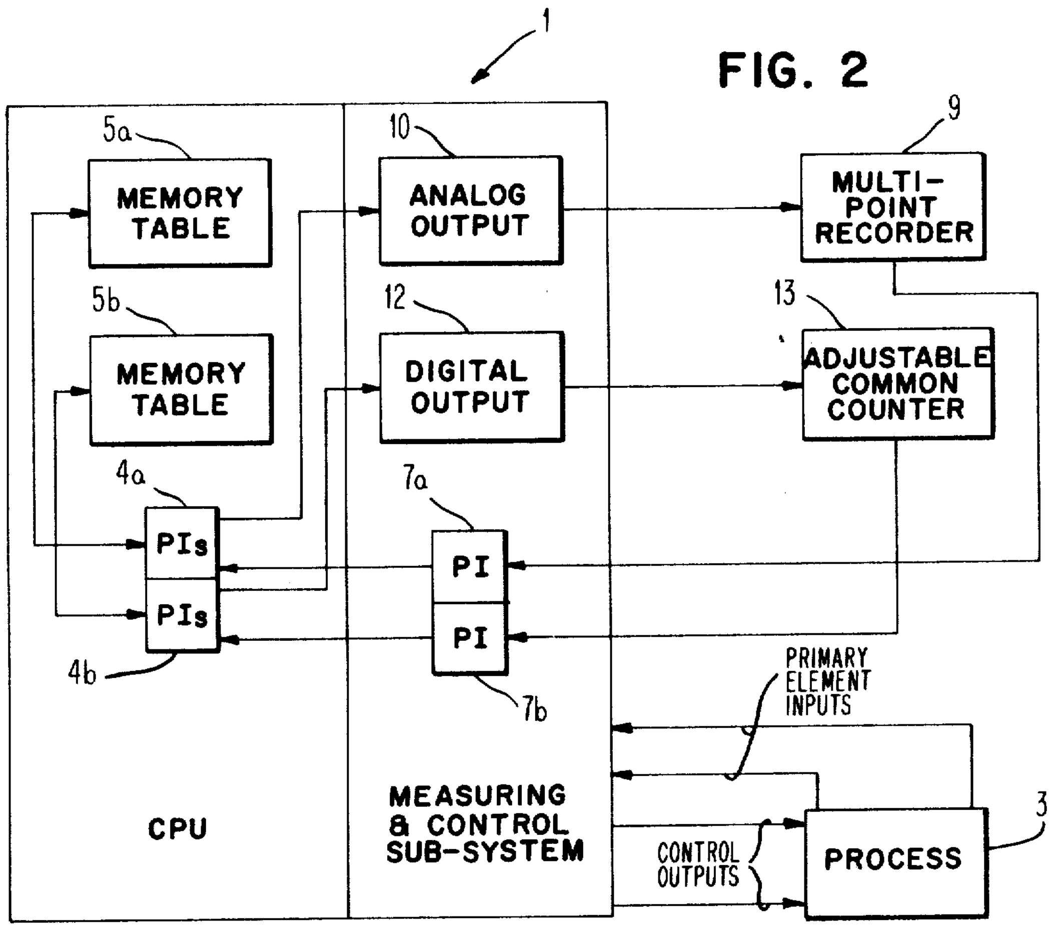
FIG. 2 is a block diagram corresponding to FIG. 1 of a preferred embodiment of the invention.

Two aspects of the present invention are shown in a process control system depicted in Fig. 2. In FIG. 2 the interface subsystem includes two priority interrupt logic circuits *7a* and *7b* to service the multipoint recording and the timed events multiplexing, respectively. Similarly, in the computer two priority interrupt server channels are utilized. The priority interrupt server *4a* services the multipoint recorder and the priority interrupt server *4b* services the multiplexing of timed events. The memory has been shown as including at least two sections. The memory contains a table of values in the section *5a* representing addresses and data conditioning requirements of the values to be recorded. The memory also includes a table in section *5b* of values of time durations, and identification of devices to be controlled.

A multipoint record 9 is provided to record process variables as represented by signals obtained from the computer memory. In this case, the memory *5a* contains a table of values indicating the addresses of the memory locations of the values which are to be recorded. Also included are parameters for data conditioning, scaling, filtering, etc. As will be described more fully hereinafter, the priority interrupt server *4a* has two functions. The priority interrupt server *4a* advances the index of the table contained in memory *5a* each time the recorder 9 produces a signal indicating that it is ready for the next point to be recorded. The priority interrupt server *4a* also synchronizes the index with the recorder. In FIG. 2 the converter 10 in the interface subsystem includes a digital-to-analog converter which converts digital values from the memory into analog voltages for recording. There are a number of multipoint recorders which are suitable for use in such a system. One recorder particularly suitable for use is the Leeds & Northrup Cleertrend Multipoint Recorder which is commercially available and which is also described in U.S. Pat. No. 3,316,554. While many process control computers can be used in accordance with the present invention, the Leeds & Northrup 4000 and Leeds & Northrup 5000 computer systems are particularly suitable for this purpose. For a description of the Leeds & Northrup 4000 computer, reference is made to the following publications: LN 4000 Computer Control System, Leeds & Northrup, Jan. 30. 1967 and the SDS 910 Computer Reference Manual, Scientific Data Systems, 1964.

There will now be described another aspect of the present invention in which a plurality of timed pulse durations are stored in a table in memory 5*b*. The memory 5*b* contains a table of pulse durations to be utilized in control. The memory also contains a section containing bits defining the timed event. These bits can be used to generate the outputs representing timed pulse durations. In this embodiment, these bits are applied as a digital control output to the process 3 which is being controlled. This control function may also be implemented through an analog output for some applications.

The converter in the interface subsystem includes a register 12 for storing a digital output word. An external counter 13 receives a digital output word related to one of the digital values. The counter 13 is activated by the digital output word from the register 12 for updating elapsed time between events in accordance with the computed time duration. The counter 13 is timed out at a preset timing rate to produce a priority interrupt signal representing counter equal zero. The priority interrupt signal is applied to the priority interrupt logic circuitry 7*b* to terminate the event currently being timed out. The priority interrupt server 4*b* interrupts the normal order of the computer program to update the value contained in the table of digital values representing computed time durations. This updated value is then transferred to the register 12 and the foregoing cycle is repeated.

Figure 3:
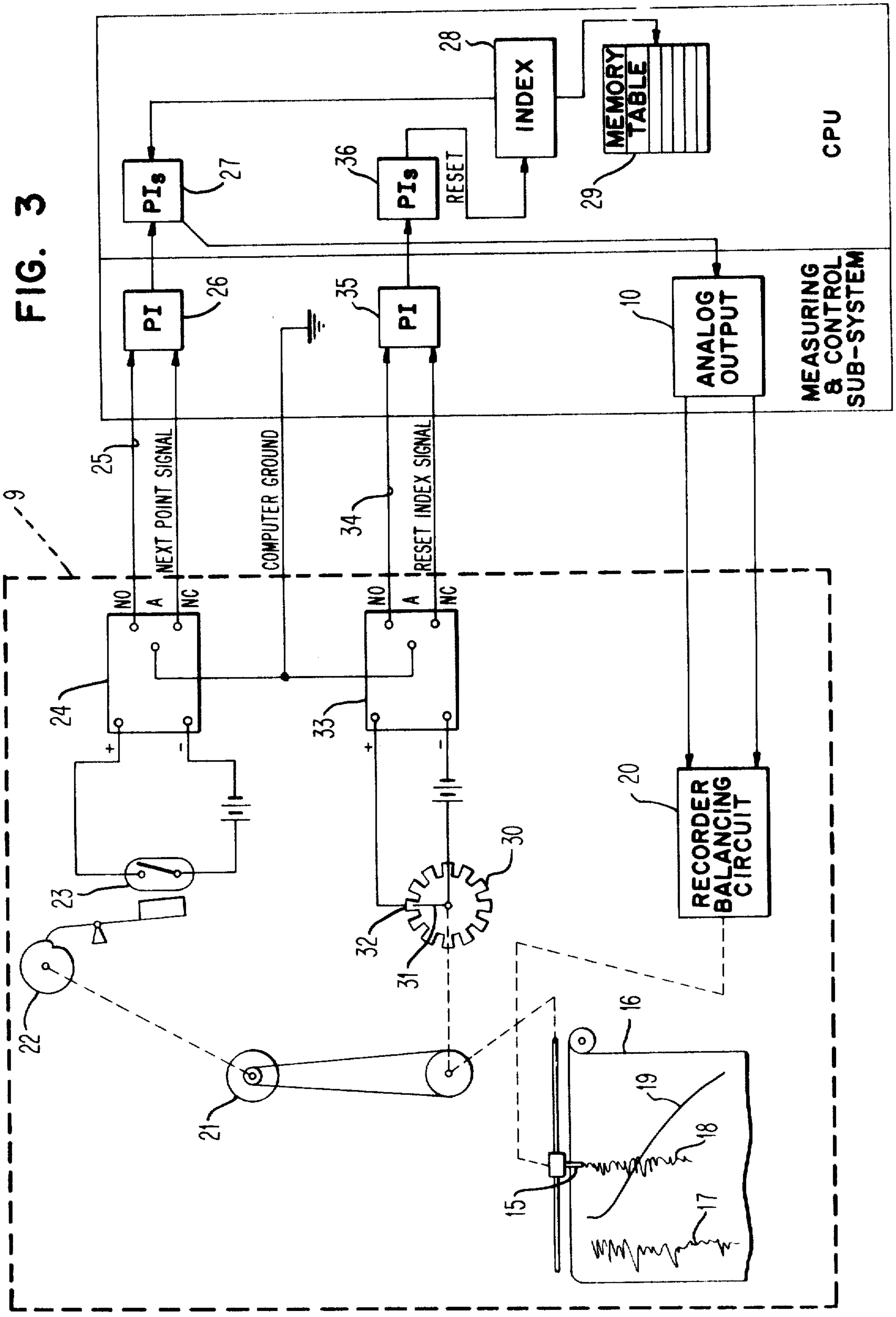
FIG. 3 is a block diagram of the embodiment of FIG. 2 in somewhat further detail.

FIG. 3 shows the operation of the computer trend recorder in more detail. The recorder 9 is a conventional multipoint recorder in which the pen 15 is sequentially positioned to a different points on the chart paper 16 to sequentially record the value of a plurality of variables. Several of these variables are indicated by the tracings 17, 18 and 19. A recorder balancing circuit 20 responds to analog voltages to position the pen 15 to a particular location on the chart paper. Actually, a sequence of analog voltages is the input to balancing circuit 20. This sequence of voltages represents the values of a plurality of process related variables to be recorded.

A print motor 21 sequentially drives the pen 15 into contact with the chart paper to record each of the variables.

The recording of each variable is sensed and a priority interrupt signal is generated in response thereto to signal the computer to output the next variable, that is, the next point, to be recorded. In order to do this, a cam 22 is driven by the print motor 21. Each time the print motor 21 rotates to record a value, the cam 22 closes the contacts 23 of a reed relay to produce a next point signal. This next point signal actuates a mercury form "C" relay 24. The normally open contacts of this relay are closed to apply computer ground over the line 25 to produce an interrupt signal. The interrupt signal is applied to the priority interrupt circuit 26 in measuring and control subsystem to provide signal buffering and logic conditioning.

The priority interrupt signal acts through the priority interrupt circuit 26 and the priority interrupt server 27 to advance the index 28 of the table of addresses of values to be recorded, the table of values being indicated at 29.

In order to synchronize the recording of the various points with the values outputted by the computer, a second priority interrupt channel of the computer is used. The table 29 is synchronized with the actual recording of values by the recorder 9 by this second priority interrupt channel. This priority interrupt channel is actuated by a reference signal produced by the recorder.

The recorder 9 includes an input select relay set 30. This set includes a star wheel with a rotating wiper which is moved to a different contact by the print motor each time that a point is recorded. When the rotating contact 31 comes to rest on the contact 32, indicating in this case that point No. 12 has been recorded, the mercury form "C" relay 33 is actuated. The normally open contacts of relay 33 apply computer ground to the line 34. This produces a reference signal which acts through priority interrupt buffer and logic circuit 35 and priority interrupt server 36 to reset the index 28 to the address in this case of pint one, i.e., the first value in the sequence to be recorded. Therefore, the next value to be outputted by the computer will be point one. This synchronism is quite important in a system of this type since it is possible for the recorder to get out of step with the computer and, if this is not corrected for each cycle, all of the values on the record will be mixed.

Figure 4:
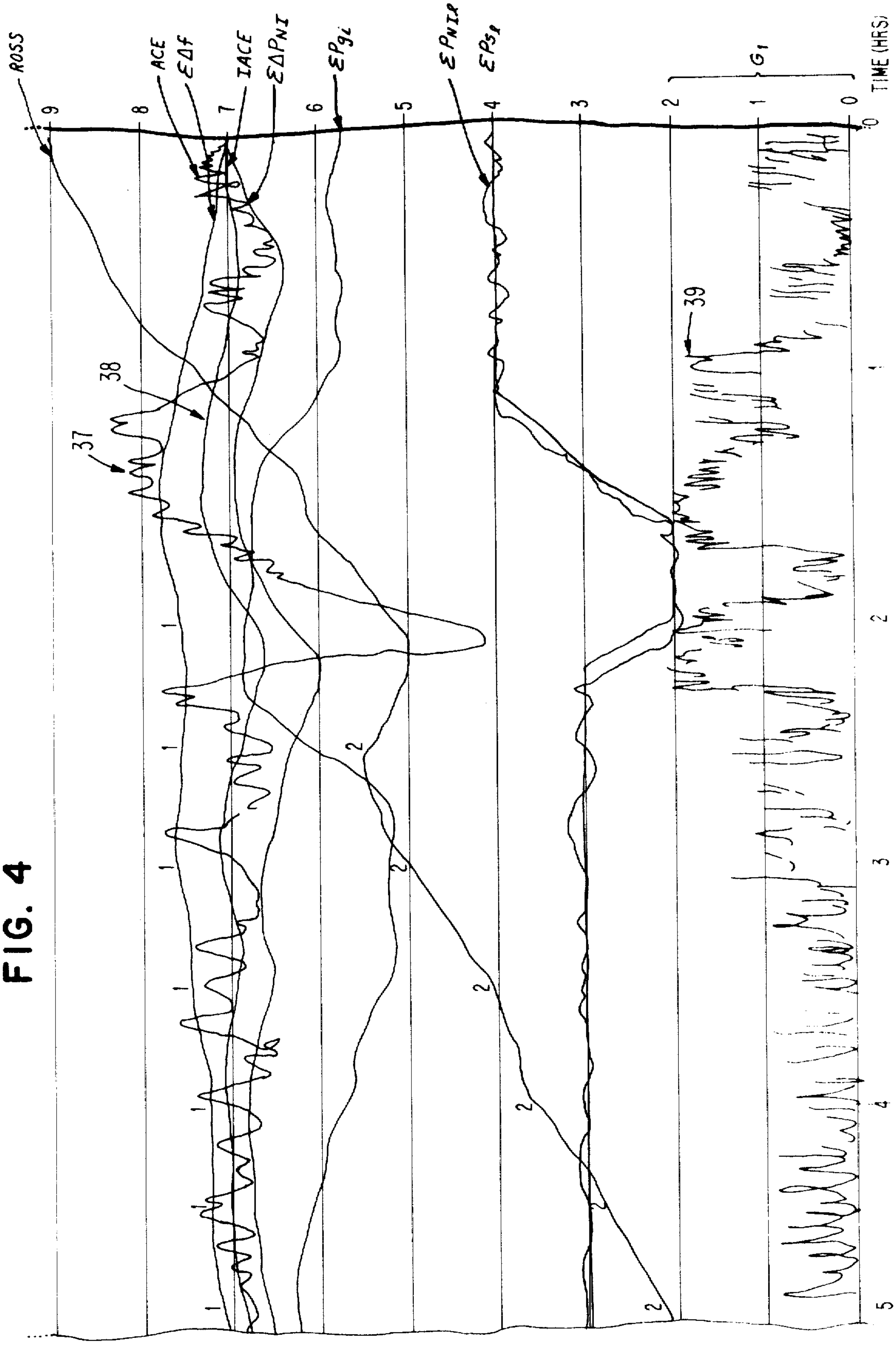
FIG. 4 is a record produced by the embodiment of FIGS. 2 and 3.

Referring to FIG. 4, there is shown a record produced by the multipoint recorder in the system of this invention. Each trended point is constructed by a sequence of dots as the recorder moves from point to point. The exemplary record depicts the operation of an electric power system. A number of different points have been trended. For example, the trace 37, ACE, is the area control error representing the primary control error of the process. The trace 38 represents the integral of the area control error and the trace 39 represents the variable controller gain. The variable controller gain 39 is a function of area control error and its integral. Also depicted on the record are a trace representing the total system generation $\Sigma P_{gt}$, a trace representing the total scheduled transfer of power to the interconnection, $\Sigma P_{st}$, and a trace representing the actual interchange of power, $\Sigma PNI_t$. Many other variables may also appear as selected.

From FIG. 4, it is readily seen that the recording of the plurality of variables representing the process produces a readily correlated trace of the process performance. FIG. 4 also shows the importance of synchronizing the outputting of variables by the computer with the recording by the recorder. Each of the traces in FIG. 4 is typically recorded in a different color and each trace has associated therewith point numbers at selected intervals on the chart paper. If the computer is out of step with the recorder, the variables will continue to be recorded, but they will be recorded in the wrong color and with the wrong point number.

Figure 5:
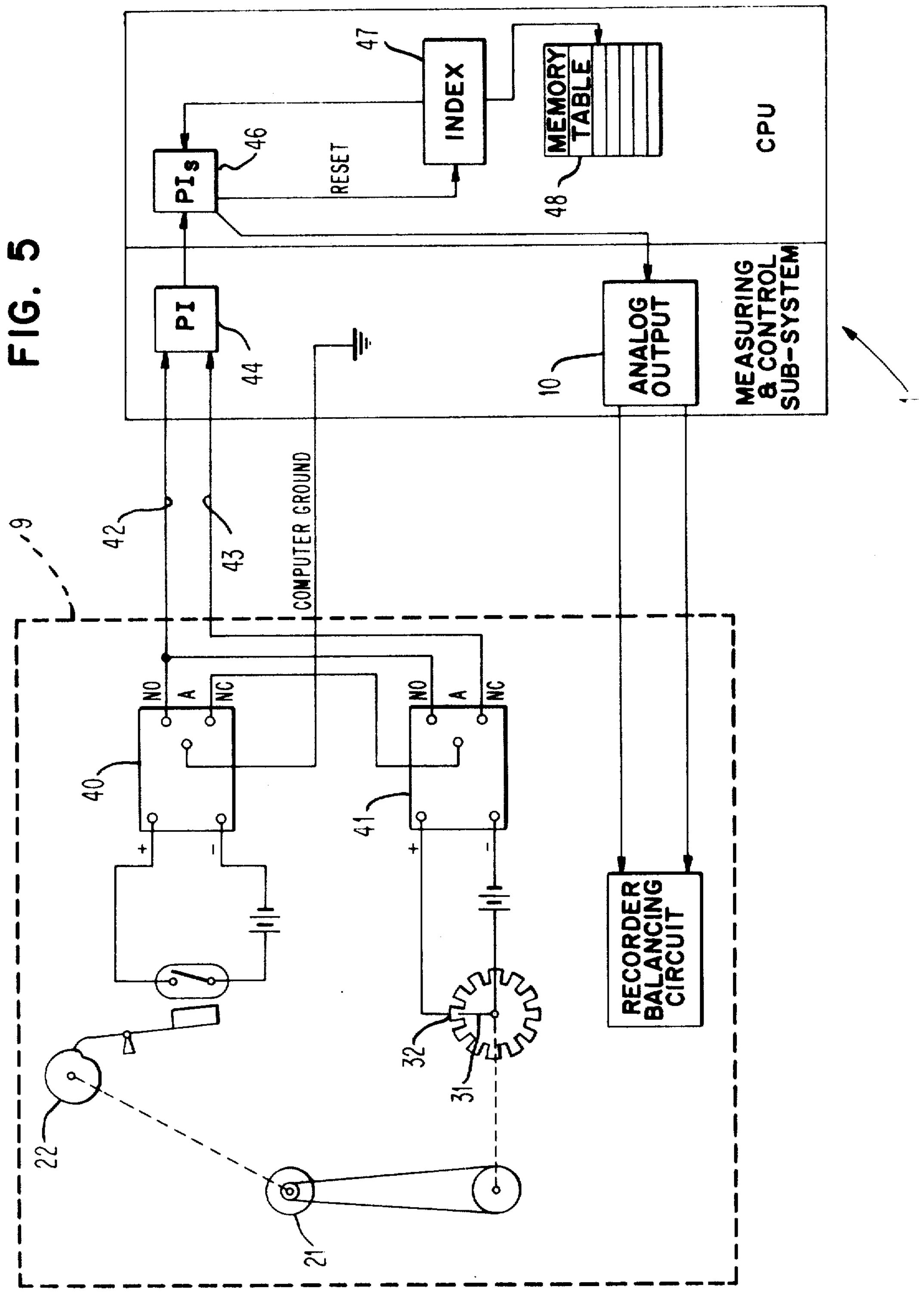
FIG. 5 is a block diagram showing a modification of the embodiment of FIG. 3.

Referring now to FIG. 5, there is shown a system in which synchronization between the computer and the recorder is achieved with the use of only one priority interrupt channel in the computer. In this system, the movable contact 31 of the input select relay set produces a reference signal a small increment of time after the cam 22 produces the next point signal. The next point signal actuates the mercury form "C" relay 40 and the reference signal actuates the mercury form "C" relay 41. In this embodiment, computer ground is connected through the contacts of the relay 40 and through the contacts of the relay 41 to the lines 42 and 43. The relays 40 and 41 are wired to perform the logic function "or".

Figure 6:
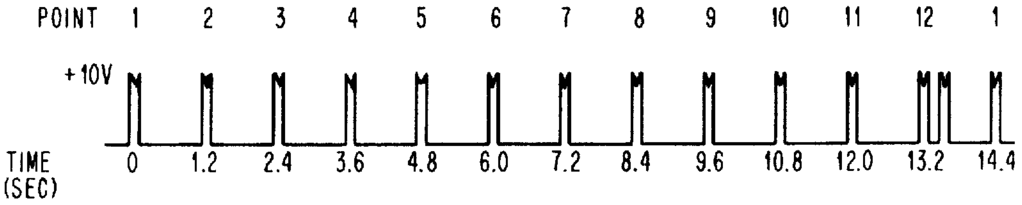
FIGS. 6 and 7 are diagrams of signals associated with the modification of FIG. 5.
Figure 7:
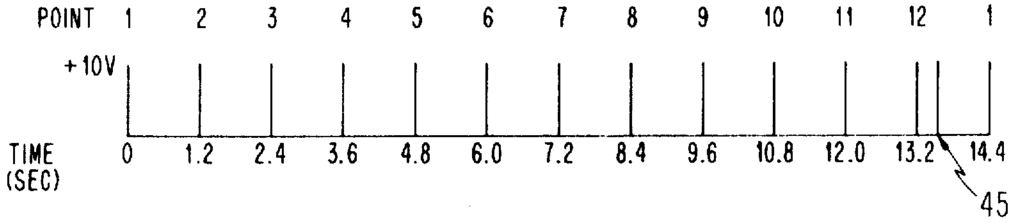

The signal on line 42 is shown in FIG. 6. (The signal on line 43 has the same timing but the signal is inverted.) The priority interrupt signal at the output of the priority interrupt buffering and logic circuit 44 is shown in FIG. 7. It will be noted that a priority interrupt signal is produced every 1.2 seconds as each one of the 12 points is recorded. (The print motor 21 is a 50 cycle per minute print motor; hence a point is printed every 1.2 seconds thereby producing priority interrupt signals every 1.2 seconds.) After the recording of the twelfth point, an extra priority interrupt, or reference, signal is produced as indicated at 45 in FIG. 7 (The use of the twelfth point is exemplary; the recording of any point could be used to produce the extra priority interrupt signal.)

Figure 8:
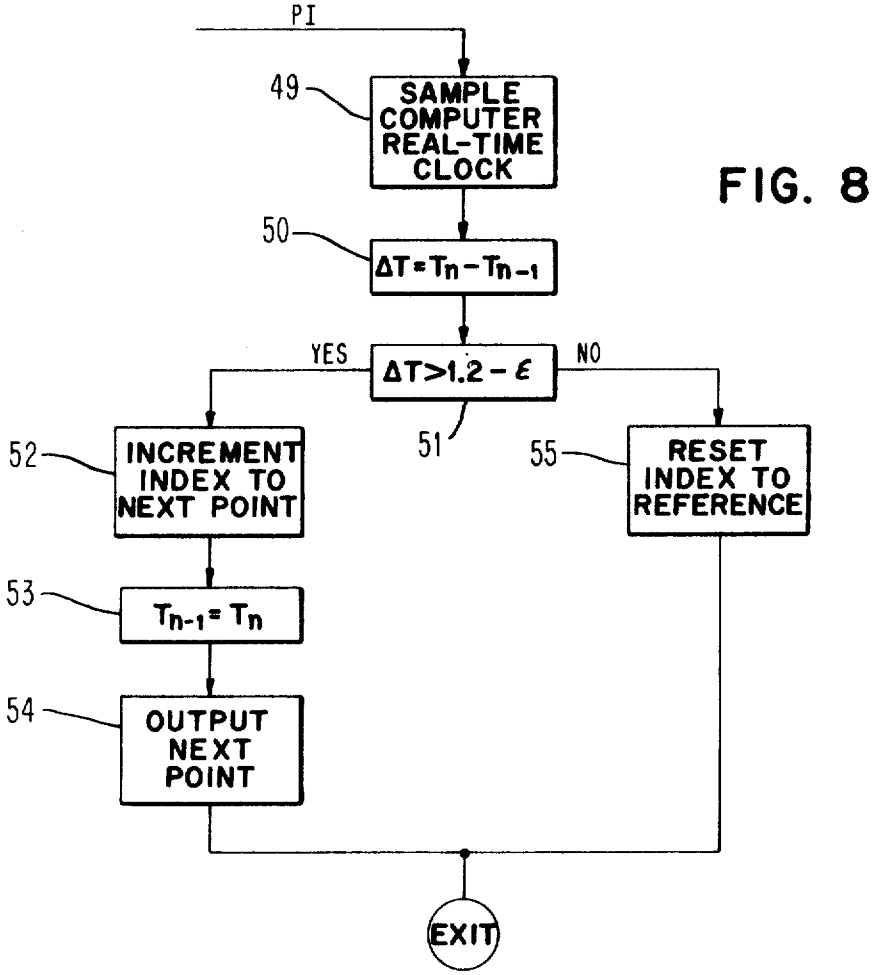
FIG. 8 is a block diagram illustrating the functions of a priority interrupt server of FIG. 5.

In order to obtain synchronization, the priority interrupt server 46 performs the function indicated by the functional block diagram of FIG. 8. Briefly, this function is to determine whether the time spacing between program interrupt signals is greater than 1.2 seconds. If it is not, there is an indication that the reference signal has been produced and the index 47 is reset to the point one address. That is, when the index 47 is reset, the next point outputted in this case will be the address of the variable to be recorded at point one.

A priority interrupt signal (FIG. 7) will cause its server 46 to perform the functions outlined in the block diagram FIG. 8. The value of the computer real time clock is sampled as indicated in FIG. 8 at 49. The priority interrupt server then determines the difference ΔT between the sample time of the present priority interrupt signal ($T_n$) and the sample time of the last priority interrupt signal ($T_{n1l}$). This function is indicated at 50. A determination is made, as indicated at 51 as to whether the time difference ΔT is greater than 1.2 seconds minus a given margin $\epsilon$(approximately 0.2 seconds). If the determination is made that the time difference is approximately 1.2 seconds, the index 47 is incremented to the next point as indicated at 52. The value $T_{n1l}$ is set equal to $T_n$ as indicated at 53, and the next point is outputted as indicated at 54.

If the time since the last program interrupt signal is small compared to 1.2 seconds, then the index 47 is reset to the address of the reference as indicated at 55 in FIG. 8. In this case no point is outputted to the recorder.

Figure 9:
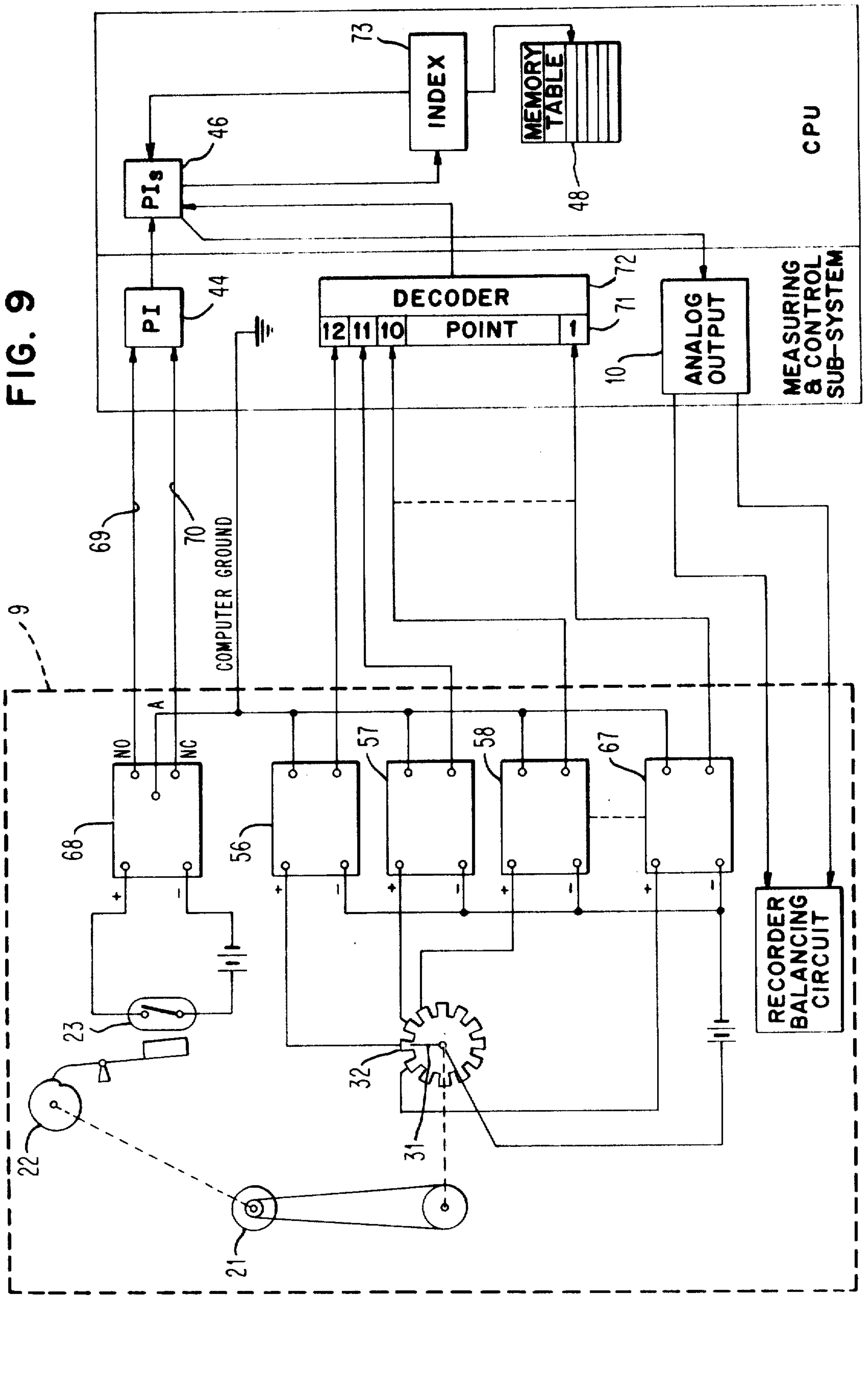
FIG. 9 is a block diagram of yet another modification of the embodiment of FIG. 3.

Another means for achieving synchronization is shown by the system in FIG. 9. In this case a plurality of recorder analog input select relays 56, 57, 58... 67 are applied to generate a reference signal in timed relation to the recording of each individual point. These select relays are normally available in multipoint recorders of this type to admit separate external analog signals. Each relay will be actuated in sequence as the rotating contact or wiper arm 31 moves to the various contacts of the star wheel.

The next point signal is generated as before. That is, the cam 22 actuates the contacts 23 which energize the relay 68 which produces a priority interrupt signal on the lines 69 and 70. This priority interrupt signal is applied to the priority interrupt circuit and priority server as before to initiate the recording of the next point.

In this embodiment the input select relay associated with each point is assigned to one bit of a digital events input word. Thus the selection of a point to be recorded will set a corresponding bit in the register 71. Each time a next point interrupt is serviced by a priority interrupt server 46, the register is read and decoder in decoder 72 to determine which bit has been set. The index 73 is computed accordingly to select the requested variable from the table of addresses 48. This scheme provides continuous synchronization of the variable requested and that which is given to the converter 10 for recording.

Figure 10:
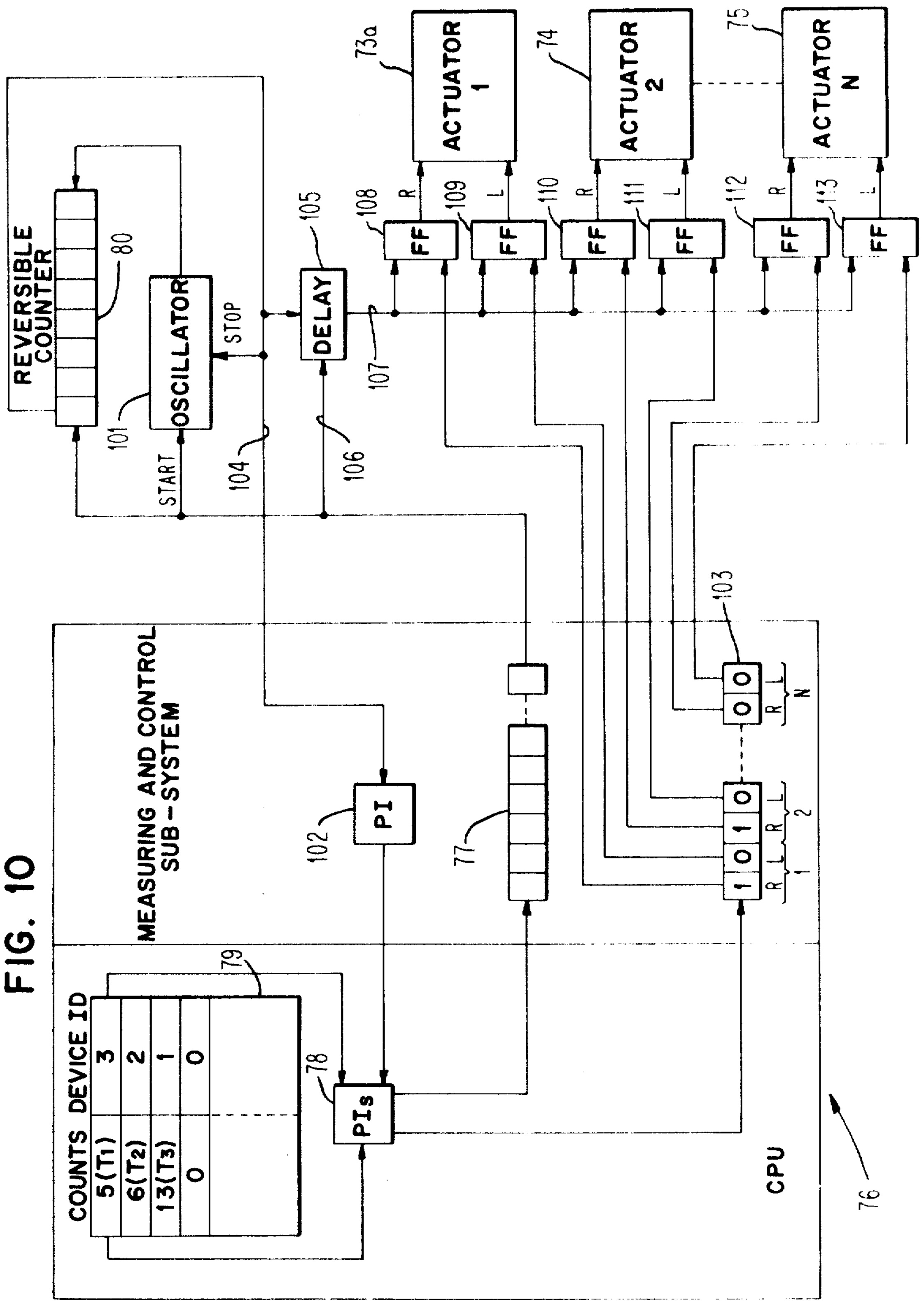
FIG. 10 is a block diagram of multiplex timed events relating to the block diagram of FIG. 2.

Referring to FIG. 10, there is shown in more detail the multiplexed timed events system which was previously described in conjunction with FIG. 2. In such a system, it is desired to produce a plurality of timed pulse duration signals each of which may be used to control a variety of external devices. For example, the signals may be used to control valve drive actuators which are used for control of the process. As shown in FIG. 10, the timed pulse duration signals are used to control actuators 73*a*, 74 and 75.

In direct digital control applications these pulse durations must be accurately timed. Each of the time durations commonly start at a common time $T_0$ but they are of varying durations. If the computer were used to generate each of these pulse durations individually, there would be a heavy burden on computer time. In accordance with the present invention, the pulse durations are produced independently from the computer processing unit without sacrificing required accuracy and without the use of the expensive real time clocks which are built into the computer central processing unit. This is also true for the case where multiple external counters would be used.

Briefly, the system includes a stored program-type process digital computer 76 which includes a register 77 for storing a digital output word. A priority interrupt server 78 is provided to interrupt the normal order of program execution of this computer. The memory contains a table of digital values in memory 79 representing computed durations for effecting a timed sequence of events.

This technique is implemented by the use of a single, external common counter 80, presettable count oscillator 101 and one interrupt channel 102. By ordering the pulse lengths in ascending order as they are computed the smallest pulse will be at the beginning of table 79. The end of the table is marked by a 0 pulse length. Note that in the table in memory 79 each word represents the pulse duration and an ID code representing the identification of the external device to be timed. That is, the first row of table 79 indicates that external device No. 3 is to receive a timed pulse duration equal to five counts. The second row of table indicates that external device No. 2, in this case actuator 74, is to receive a timed pulse duration of six counts. At the time the pulse and the device ID code are ordered into table 79, the corresponding raise R or lower L bit is set in the OUT register 103. Two bits are provided in the OUT register word for each device that could receive pulses. For the case under discussion, devices 1 and 2 are to receive pulses in the raise direction as indicated by the bits in OUT register 103. The bits in OUT register 103 are used to set flip-flops 108—113 which control the raising or lowering of actuators 73*a*, 74 and 75. For example, OUT register 103 has a "1" "0" in the bit positions for device 1 (in this case actuator 73*a*). At time $T_0$ the flip-flop 108 is set thereby initiating the application of raise pulses to actuator 73*a*.

The table 79 contains a plurality of words all ordered in accordance with ascending pulse duration. The table contains only words representing durations for external devices which are to receive control for this control period. The same is true for bits set in register 103. The device contacts associated with these pulse times are closed at time $T_0$ by outputting register 103. Then $T_1$ is outputted to the common counter 80. When it has been timed out a signal from the counter triggers program interrupt server 78. The interrupt server opens the contacts of the device associated with $T_1$ (in this case device 3) and then reloads the counter 80 with $\alpha T=T_2T_1$. A second interrupt will occur at time $T_2$ to open contacts for device 2. This multiplexing chain continues for all the $T_n$'s (*n* being the index of table 79) and their contacts.

The contents of register 77 are transferred to the external counter 80. The counter 80 is made up of stages of shift registers and the stages are counted down to zero by pulse from oscillator 77. Normally 7 stages (7-bit output) provide sufficient resolution (1 part in 128) for most applications. The output is normally a negative value counted to zero. The trigger rate for the shift registers can be external or by a self-contained, single-shot oscillator 101.

Figure 11:
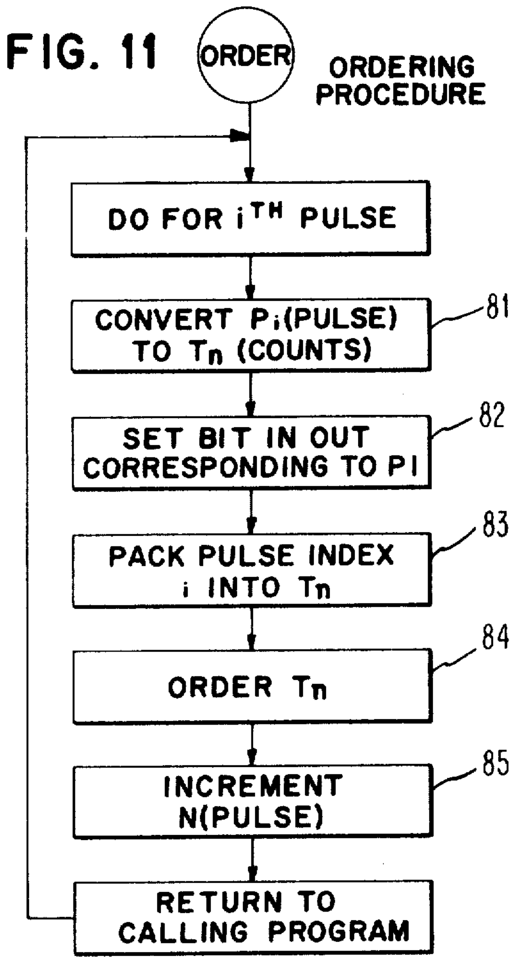
FIGS. 11—13 are block diagrams of the functions to be performed by a computer utilized in the embodiment of the invention.
Figure 12:
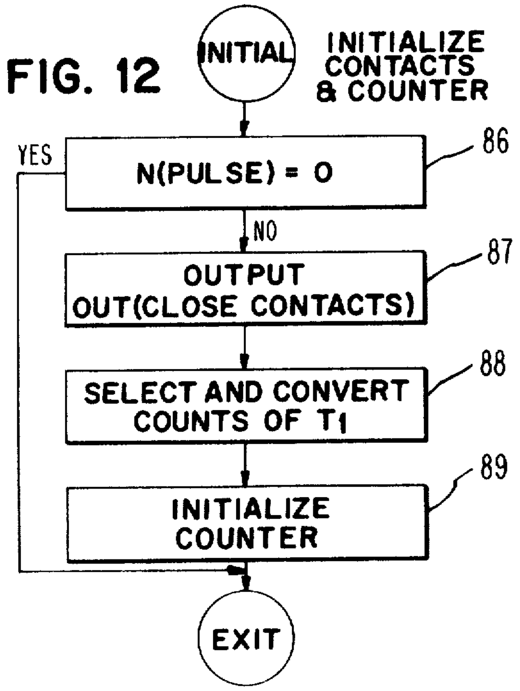
Figure 13:
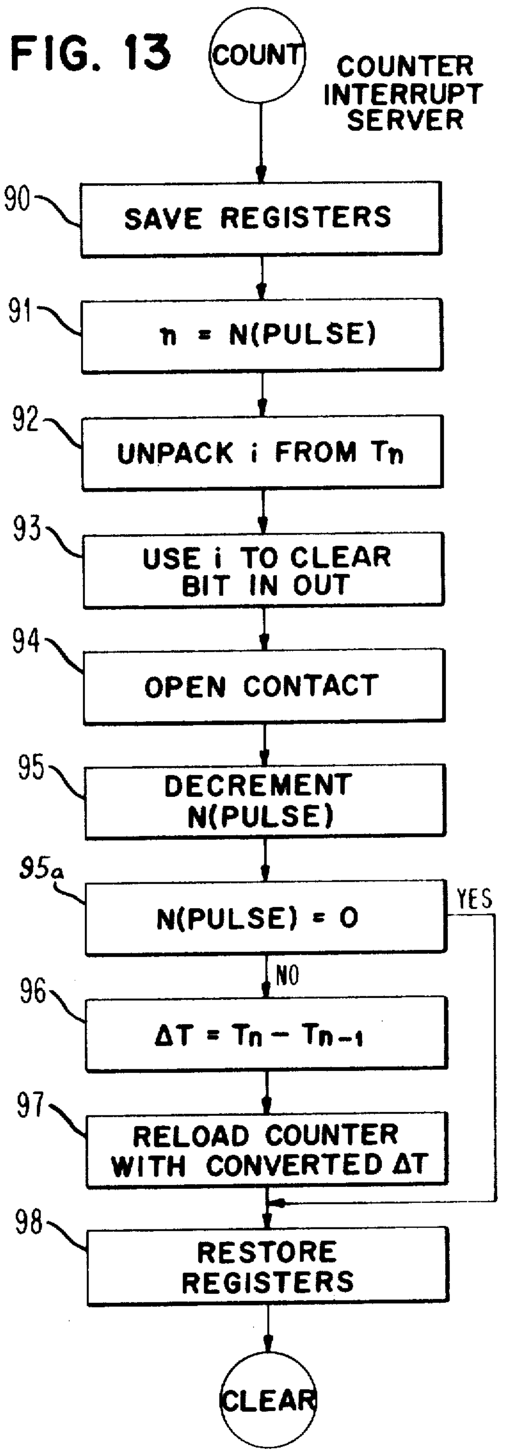

The operations of the computer in performing the above functions is depicted by the functional block diagram in FIGS. 11—13.

The ordering procedure as used by the control program to construct the table is shown in the functional block diagram of FIG. 11.

Each time a pulse is computed by the control program this procedure is executed to order it into the table in memory 79. The following steps are performed:

1. The pulse $P_i$ is converted, as indicated at 81, from engineering units into the equivalent number of counts and placed in the upper portion of $T_n$.
2. As indicated at 82, using the index of the pulse *i* the corresponding contact output bit is set in OUT register 103. The bits of OUT register 103 then are used as digital outputs to reset the corresponding flip-flop which controls the selected actuator.
3. As indicated at 83, this index value *i* can be stored in the lower end of the $T_n$ word. This is done so that the number of counts and the identity of the corresponding contact can be ordered with only one word $T_n$.

4. As indicated at 84, the $T_n$ word is then ordered into a table by dribble comparisons starting with the first entry. A zero value $T_n$ is used by the ordering operation to mark the location following the last entry in the table.
5. As indicated at 85, a counter N(pulse) is incremented to total the number of pulses computed (may be variable in many applications). This variable also serves as the index of the the *n* table.

The counter and contact initialization procedure is diagrammed in FIG. 12. After the $T_n$ table in memory 79 has been completed, the contact sequenced timing can be started by this routine. First N(pulse) is checked to determine if contact closures have been called for (as indicated at 86). If so, the OUT words are outputted to set flip-flops or to close the contacts corresponding to the bits set in OUT (as indicated at 87). Then the first $T_n$ ($T_1$, converted as required as indicated at 88) is loaded into the counter by a digital output (as indicated at 89).

The counter interrupt server is diagrammed in FIG. 13. When the counter has reached zero (timed out), the signal produced fires an interrupt. This signal also results in stopping the oscillator 101. When this interrupt is acknowledged, the following steps are taken.

1. Contents of register used by program are saved as indicated at 90.
2. The value of N(pulse) is used as an index to select the $T_n$ that has just timed out as indicated at 91.
3. The $T_n$ then contains the index *i* packed at the lower end of $T_n$ as indicated at 92.
4. This index determines the proper bit in OUT as indicated at 93.
5. This bit is reset and the proper OUT word is outputted to open the contact corresponding to the original $T_n$ as indicated at 92.
6. The index N(pulse) is decremented to select the next $T_n$ as indicated at 95. If the index is zero, the procedure skips to 98; otherwise it continues to 96 as indicated at 95*a*.
7. The next difference is computed by $\Delta T=T_nT_{n11}$ as indicated at 96 ($\Delta T$ is converted as required). The value $\Delta T$ is used to reload the counter through a digital output as indicated at 97.
8. Register values are restored and the interrupt is cleared as indicated at 98.

When the next interrupt is received, another contact is opened and a new $\Delta T$ is computed. This sequence continues until N(pulse) has been stepped to zero, all contacts are opened in which case no more interrupts are received.

Referring again to FIG. 10, the operation of the delay timer can now be described. Each time a counter equal zero signal is produced on line 104, the delay timer 105 is started. When this delay has been satisfied, a signal is produced on line 107 to reset all flip-flops 108—113. Once activated, this operation will take place when the counter 80 is not reloaded and the corresponding reset signal on line 106 is not received. This is a backup operation which prevents actuator operation for uncontrolled periods of time, that is, if the flip flops 108—113 have not been reset during the normal course of timing out each pulse duration, they will be reset by the delay timer 105. This operation also takes place when the last pulse is timed out to insure that all device contacts are opened.

Figure 14:
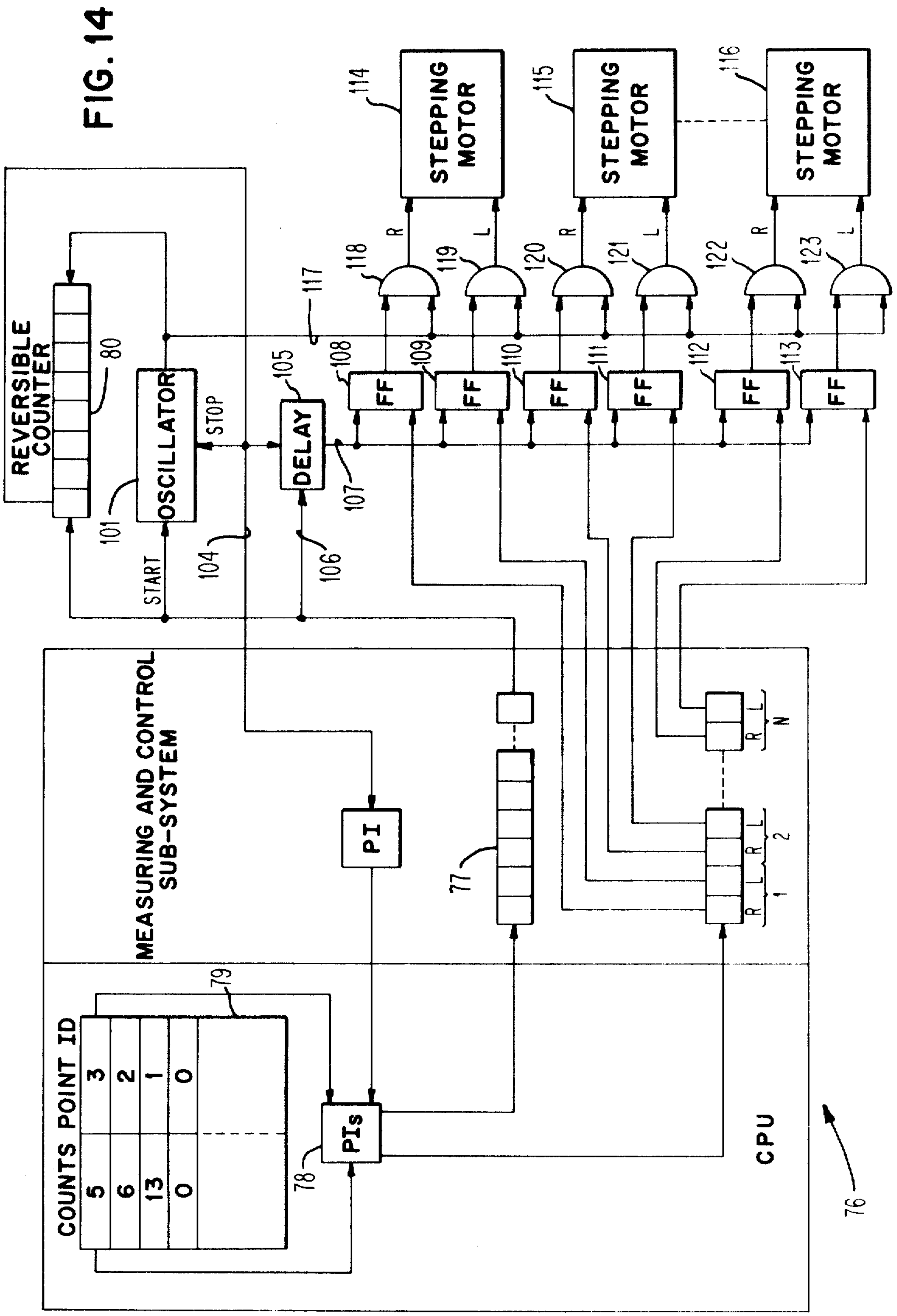
FIG. 14 is a block diagram showing modifications in the multiplex timed events of FIG. 10.

When it is required that the actuator receive a sequence of pulses, as in the case of a stepping motor, the scheme is embodied as shown in FIG. 14. In this case, it is required to admit pulses from the oscillator 101 to stepping motors 114, 115 and 116 in response to the signal on line 117. This pulse sequence may also be generated by an independent oscillator as required. The pulse sequence is admitted to the stepping motors by the action of the logic gates 118—123 which are conditioned by the flip-flops 108—113. All other operations designated by identical reference numerals perform the same functions.

While particular embodiments of the invention have been shown and described, it will, of course, be understood that various modifications may be made without departing from the principles of the invention. The appended claims are, therefore, intended to cover any such modification within the true spirit and scope of the invention.

We claim:

1. The combination of:
a stored program type process digital computer having:
input means for receiving a plurality of primary element input signals to be stored and processed under control of said stored program,
a priority interrupt logic circuit,
a digital-to-analog converter at the output of said computer for outputting values to be utilized by an external device,
a programmed interrupt server for interrupting the normal order of said program in response to said logic circuit, and
memory means containing values to be accessed by said interrupt server,
a multipoint analog recorder multiplexed to utilize a plurality of values from said computer, said recorder having:
means for producing a priority interrupt signal,
means for producing a reference signal in timed relation to the recording of at least one specific point, said reference signal synchronizing the output of said digital-to-analog converter with the point to be recorded on said multipoint analog recorder
said logic circuit being responsive to said priority interrupt signal to output the next value to be utilized by said recorder.

2. The combination of:
a stored program type process digital computer having:
input means for receiving a plurality of primary element input signals to be stored and processed under control of said stored program,
a digital to analog converter at the output of said computer,
a programmed interrupt sever for interrupting the normal order of said program,
a multipoint recorder,
means for producing a next point signal in timed relation to the recording of each point on said multipoint analog recorder,
interrupt apparatus comprising:
means for producing an interrupt signal in response to said next point signal, said interrupt signal being applied to said computer to request said interrupt server to output the next point to be recorded, and
means for producing a reference signal in timed relation to the recording of at least one specific point, said reference signal synchronizing the output of said digital to analog converter with the point to be recorded on said multipoint analog recorder.

3. The combination of:
a stored program type process digital computer having:
input means for receiving a plurality of primary element input signals to be stored and processed under control of said stored program,
a digital-to-analog converter at the output of said computer,
a programmed interrupt server for interrupting the normal order of said program,
a memory containing a table of digital values representing the durations for effecting a timed sequence of events,
a multipoint recorder,
means for producing a next point signal in timed relation to the recording of each point on said multipoint recorder, said next point signal synchronizing the output of said digital-to-analog converter with the point to be recorded on said multipoint recorder,
means for producing an interrupt signal in response to said next point signal, said interrupt signal being applied to said computer to request said interrupt server to output the next point to be recorded, a counter for receiving a digital output word related to one of said digital values, said counter being activated by said digital output word for updating elapsed time between events in accordance with said computed durations, and means for generating a count with said counter at a preset counting rate to produce a priority interrupt signal representing counter equals zero, said priority interrupt signal being applied to said computer to terminate the event currently timed out, said interrupt signal being applied to said computer to advance to the next of said digital values in said table and to update the elapsed time to equal the duration of said next event to be timed out.

4. The combination recited in claim 3 further including:

a plurality of process control devices, each being actuated for time durations specified by said digital values representing computed durations, means for actuating said control devices at a common time, and means for terminating the actuation of each control device in response to said priority interrupt signal.

'0-1050
(5/69)

UNITED STATES PATENT OFFICE
CERTIFICATE OF CORRECTION

'atent No. 3,585,603 Dated June 15, 1971

Inventor(s) Charles W. Ross and Thomas A. Green

It is certified that error appears in the above-identified patent and that said Letters Patent are hereby corrected as shown below:

| | |
|---|---|
| 'ol. 1, line 5 | "may" should read --many--, |
| 'ol. 2, line 65 | "record" (first occurrence) should read --recorder--, |
| 'ol. 3, line 46 | after "to" delete --a--, |
| 'ol. 3, line 68 | after "in" insert --the--, |
| 'ol. 4, line 16 | "pint" should read --point--, |
| 'ol, 5, line 16 | "$(T_{n1l})$ should read --$(T_{n-1})$--, |
| 'ol. 5, line 22 | "$T_{n1l}$" should read --$T_{n-1}$--, |
| 'ol. 6, line 43 | "$\Delta T=T_2T_1$." should read --$\Delta T=T_2-T_1$.--, |
| 'ol. 7, line 8 | "the the n table." should read --the $T_n$ table.--, |
| 'ol. 7, line 25 | "register" should read --registers--, |
| 'ol. 7, line 39 | "$\Delta T=T_nT_{n1l}$" should read --$\Delta T=T_n-T_{n-1}$--, |
| 'ol. 8, line 39 | Claim 2, "sever" should read --server--. |

Signed and sealed this 18th day of April 1972.

(SEAL)
Attest:

EDWARD M.FLETCHER,JR. — Attesting Officer

ROBERT GOTTSCHALK — Commissioner of Patents